May 27, 1941.  B. S. AIKMAN  2,243,450
BRAKE AND SANDING CONTROL MEANS
Original Filed Jan. 12, 1940  2 Sheets-Sheet 1

INVENTOR
BURTON S. AIKMAN
BY
ATTORNEY

May 27, 1941.  B. S. AIKMAN  2,243,450
BRAKE AND SANDING CONTROL MEANS
Original Filed Jan. 12, 1940  2 Sheets-Sheet 2

INVENTOR
BURTON S. AIKMAN
BY
ATTORNEY

Patented May 27, 1941

2,243,450

UNITED STATES PATENT OFFICE 2,243,450

BRAKE AND SANDING CONTROL MEANS

Burton S. Aikman, Wilkinsburg, Pa., assignor to The Westinghouse Air Brake Company, Wilmerding, Pa., a corporation of Pennsylvania Original application January 12, 1940, Serial No. 313,513. Divided and this application March 30, 1940, Serial No. 326,927

8 Claims. (Cl. 291—2)

This invention relates to fluid pressure brake and sander controlling means, and more particularly to means for controlling the application of the brakes and sanding of the rails in a manner to inhibit or wholly prevent sliding of vehicle wheels during application of the brakes. The present application is a division of my copending application, Serial No. 313,513, which was filed in the United States Patent Office January 12, 1940.

It is well known that sliding of vehicle wheels due to application of the brakes thereon is objectionable, both because of damage done to the wheels and because of the reduced retarding effect which is produced by a sliding wheel. As a consequence, it is desirable that means be provided which will detect an incipient stage of wheel sliding and then operate immediately to correct the condition and permit the wheel to assume normal rotation. The incipient stage of wheel sliding is generally referred to as a slipping condition of the wheel, that is to say, a wheel is said to slip when it rotates at a speed below that of non-slipping wheels, and is said to slide when not rotating at all and held in a locked state.

An object of the invention is to provide fluid pressure controlled means having a mechanism operatively responsive to an abnormal or sudden reduction in the rotative speed of a vehicle wheel, resulting in initial slipping thereof during application of the brakes, to effect automatic sanding of the rails, followed by quick release of the braking force when necessary, thereby preventing sliding of the wheels.

It is a further object of the invention to provide a brake and sanding control apparatus including means responsive to abnormal change in the rotative speed of the wheel of the vehicle to effect supply of sand to the rail in advance of the wheel regardless of the direction in which the vehicle is moved.

Figure 1:
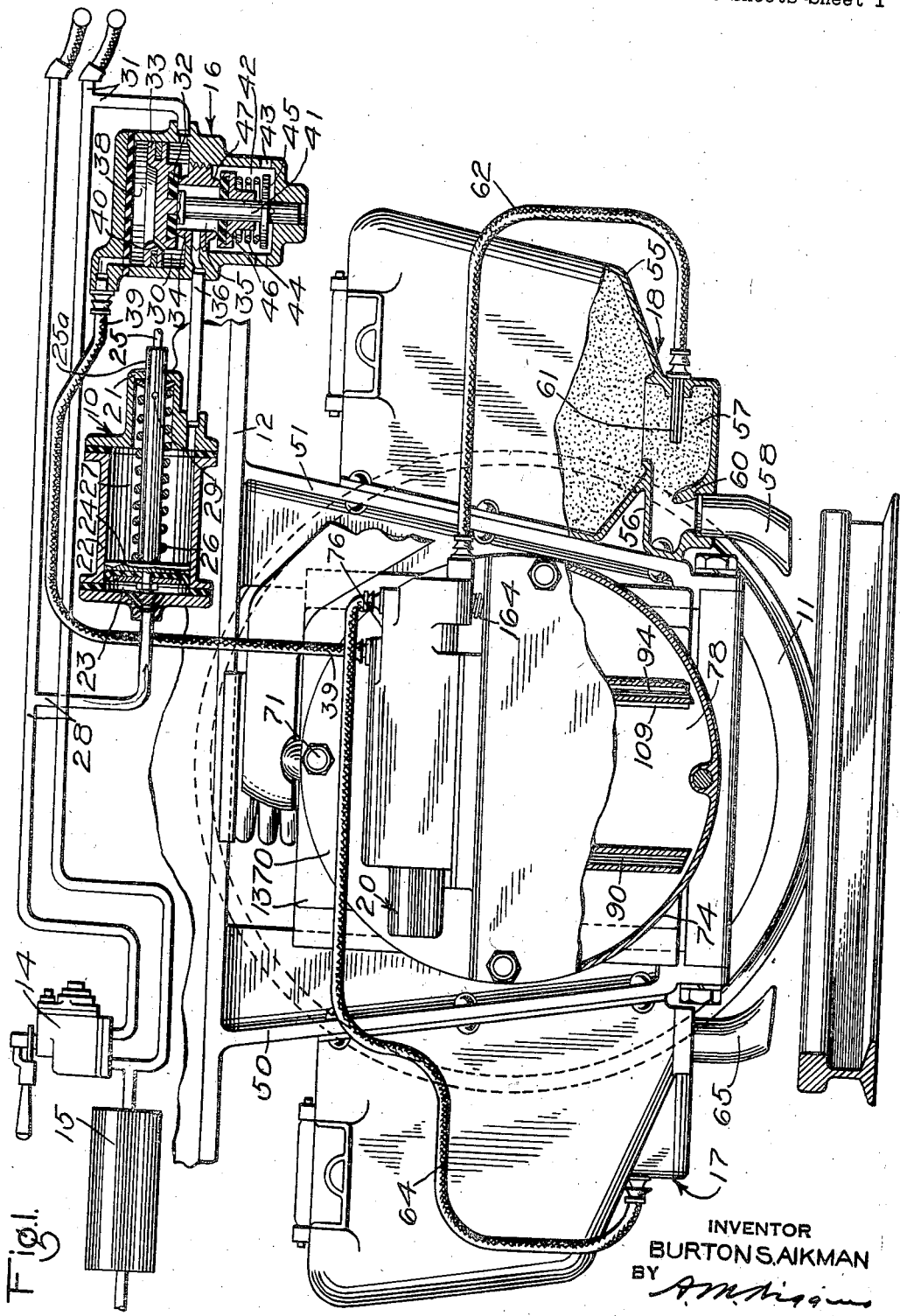
Figure 2:
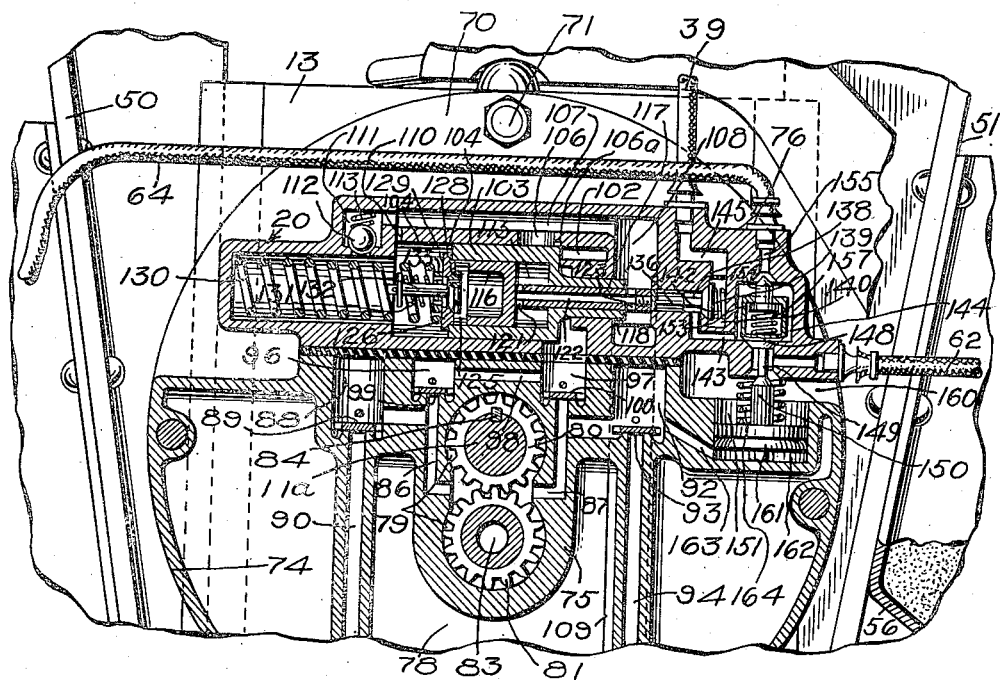

Other objects and advantages of the invention will appear in the following more detailed description thereof, taken in conjunction with the accompanying drawings, in which Fig. 1 is a diagrammatic elevational view, mainly in section, of a fluid pressure brake and sanding control equipment embodying features of the invention; and Fig. 2 is an enlarged detail sectional view of a portion of the control mechanism shown in Fig. 1.

Description

According to the invention as embodied in the equipment shown in Fig. 1 of the drawings, there is provided a brake cylinder device 10 which is suitably connected through the medium of rigging means, not shown, to the usual brake mechanism associated with a wheel and axle assembly 11 of a railway truck. The truck is illustrated in fragmentary form and includes a truck frame 12 adapted to be supported on a journal box 13. The braking equipment further comprises a self-lapping brake valve device 14, a reservoir 15, a brake release valve device 16, a pair of sanding devices 17 and 18, and a deceleration control valve mechanism indicated generally by the character 20.

The brake cylinder device 10 comprises a casing 22 within which is slidably mounted a piston 24 dividing the casing into chambers 23 and 27. The piston is operatively connected by means of a piston rod 25 to the usual brake rigging, not shown. The piston rod is contained within a sleeve element 25a, which is slidably fitted in an aperture in the end 21 of the casing, and has formed therein a relief port 29. A release spring 26 is mounted within the chamber 27 for moving the piston 24 toward release position when fluid under pressure is released from the chamber 23, or when fluid under pressure is supplied to the chamber 27, as hereinafter explained. The piston chamber 23 is adapted to be supplied with fluid under pressure through the medium of a pipe 28, which is connected with the supply port of the self-lapping brake valve device 14 and may extend throughout the train.

The brake release valve device 16 is adapted to respond to operation of the deceleration control valve device 20, as hereinafter explained, to control the supply of fluid under pressure to the chamber 27 of the brake cylinder device 10 for the purpose of preventing sliding of the wheels. This valve device comprises a casing having a valve chamber 30 communicating with a fluid pressure supply pipe 31, within which chamber is mounted a valve 32 that is carried by a piston 33 and is adapted to engage a valve seat rib 34 formed in the casing. The valve 32 controls communication from the valve chamber 30 to a bore 35, which communicates by way of a pipe 36 with the chamber 27 of the brake cylinder device 10. The piston 33 is subject to the opposing pressures of fluid in the valve chamber 30 and in a chamber 38, which communicates with a conduit 39 leading to a communication in the deceleration control valve device 20 hereinafter described. A restricted passage 40 formed in the piston 33 provides communication between the chambers 38 and 30.

The valve 32 has a stem 41 which extends through the bore 35 and into a spring chamber 42 communicating through a port 43 with the atmosphere, which stem is normally urged downwardly to hold the valve 32 in seated position under the pressure of a spring 44 that is interposed between a collar 45 carried by the stem and a valve element 46 slidably mounted thereon. The valve element 46 is in turn urged into seated engagement with a seat rib 47 formed on the casing, under the force exerted by the spring 44, for closing communication between the bore 35 and the atmospheric chamber 42.

The sanding devices 17 and 18 are similarly constructed, and are secured by bolts or other suitable means on downwardly extending strut members 50 and 51, which form portions of the vehicle frame 12 and are disposed on opposite sides of the usual journal box 13 associated with the wheel and axle assembly 11. The sanding device 18 is illustrated partly in section, and comprises a sand hopper 55 having formed on the lower side thereof a portion 56, in which is formed a sand chamber 57 that communicates with a sand discharge pipe 58 adapted to direct flow of sand to the rail adjacent the wheel. Sand contained in the hopper 55 is adapted to flow under the force of gravity into the sand chamber 57, where it is normally retained by a baffle wall 60 formed on the casing within the chamber. A nozzle 61 communicating with a conduit 62 and mounted in the casing portion 56 within the sand chamber 57 is adapted to direct flow of fluid under pressure through the chamber for driving sand over the baffle wall 60 and through the sand pipe 58. The conduit 62 is adapted to be supplied with fluid under pressure in response to operation of the deceleration control valve device 20 as hereinafter explained.

It will be understood that the sanding device 17 has the same construction as that of the sanding device 18. The sanding mechanism 17 is adapted to be supplied with fluid under pressure by way of a conduit 64 for depositing sand on the rail through the medium of a sanding pipe 65.

The acceleration control valve device 20 comprises a casing structure including a main section 70 secured by suitable means, such as bolts 71, to the journal box 13, a reservoir portion 74, a pump portion 75, and a valve portion 76. Formed within the reservoir portion 74 of the casing structure is a liquid supply chamber 78 which is adapted to be filled with a suitable liquid, such as oil. The pump portion 75 of the casing structure is disposed partly within the chamber 78 and has formed therein a pair of connected circular chambers 79 within which are rotatably mounted two intermeshed pumping gears 80 and 81. The gear 81 is mounted on a pin or shaft 83 which is suitably journaled in the casing structure, and the other gear 80 may be secured to an extension 11a of the vehicle axle by means of a key 84. The pumping gears 80 and 81 are adapted to be operated to supply liquid from the supply chamber 78 to either of two oppositely disposed receiving passageways 86 and 87, depending upon the direction of rotation of the wheel and axle assembly 11, as hereinafter explained.

The passageway 86 communicates with an inlet valve chamber 88 which contains an inlet valve 89 for controlling communication to the valve chamber from a vertically disposed intake conduit 90 that extends to the lowermost portion of the supply chamber 78. Similarly, the passageway 87 communicates with an inlet valve chamber 92 containing an inlet valve 93 which controls communication between the valve chamber and an intake pipe 94 opening into the supply reservoir 78. Both of the passageways 86 and 87 also communicate with discharge valve chambers 96 and 97, respectively, which are connected together by way of a passage 98. Discharge valves 99 and 100 are disposed in the valve chambers 96 and 97 for preventing back flow of liquid to the respective passageways 86 and 87.

Formed in the valve section 76 of the casing structure and preferably extending longitudinally thereof is a bore 102, which communicates directly with the discharge valve chamber 97 and by way of passage 98 with the discharge valve chamber 96. Slidably mounted in the bore 102 is a piston 103 having formed at one side thereof a chamber 104. The piston 103 is adapted to vary the flow area of a port 106 connecting the bore 102 with a passageway 107, which communicates by way of a discharge chamber 108 and pipe 109 with the liquid supply reservoir 78. The port 106 has a restricted portion 106a through which liquid can flow at a restricted rate from the bore 102 to the passageway 107 when the piston 103 is disposed in the normal position thereof, as shown in Fig. 1 of the drawings. The passageway 107 also communicates with the chamber 104 through a restricted port 110, and also by way of a valve chamber 111 containing a release ball check valve 112. The ball check valve 112 is urged toward seated position under the force of a spring 113, so that liquid can flow from the passageway 107 to the chamber 104 only by way of the restricted port 110, while flow of liquid in the opposite direction may be affected both by way of the port 110 and past the check valve.

The piston 103 has a longitudinal bore 115 in which is slidably mounted a smaller piston 116 having secured thereto a hollow stem 117 that is slidably mounted in a bore formed in an extension 118 of the larger piston 103, which extension is in turn slidably mounted in a bore extending between the bore 102 and chamber 108. The hollow stem 117 is provided with openings 121 connecting the bore 115 through the interior passage 122 of the stem with openings 123, which communicate with the chamber 108 at all times. At the side of the piston 116 opposite the bore 115 is formed a valve chamber 125, within which is mounted a release valve 126 that is adapted to control communication between the valve chamber 125 and the chamber 104. The release valve 126 is provided with a restricted port 128 for permitting restricted communication between the chambers 125 and 104 at all times, and is normally urged into seated engagement with an annular seat member 129 which is interposed between the end of the piston 103 and a coil spring 130 mounted within the chamber 104. The release valve 126 is thus urged toward seated position under the force of a small coil spring 131 which is interposed between a collar on the end of a stem 132 of the valve, and an apertured seat member 133 engaging the seat member 129.

To the end of the hollow stem 117 within the chamber 108 is secured a valve stem 136, which is slidably mounted in a bore 137 formed in the casing and has a fluted portion 138 carrying a valve 139. The valve 139 is disposed in a valve chamber 140 and is urged toward seated position under the force of a spring 142 for normally closing communication between the valve chamber and a passage 143 communicating with a valve chamber 144. The valve chamber 140 is connected by way of a passage 145 with the conduit 39 leading to the piston chamber 38 of the brake release valve device 16. The valve 139 is adapted to control the supply of fluid under pressure to either of the sanding devices 17 and 18 in accordance with operation of a sanding selector mechanism, which includes a valve element 148 disposed within the valve chamber 144 and connected by means of a stem 149 with a valve 150 that is disposed within a valve chamber 151 formed in the casing. The valve 148 is adapted to control communication from the chamber 144 by way of the bore containing the stem 149 to the sanding conduit 62, and carries a cage portion 153 having slidably mounted therein a plunger terminating in a valve 154, which is adapted to control communication from the chamber 144 through a passage 155 to the other sanding conduit 64. A coil spring 157 is interposed between the upper surface of the valve 148 and the lower surface of the plunger carrying the valve 154 for urging said elements apart, the spring being of such length as to hold the valve 154 in seated position only when the valve 148 is lifted from its seat as hereinafter explained. The chamber 151 is open to the atmosphere by way of an opening 160 and has slidably mounted therein a piston 161, which is adapted to operate the valves 150 and 148 and has formed at the lower side thereof a chamber 162 communicating by way of a passage 163 with the chamber 92. A coil spring 164 is interposed between a wall of the chamber 151 and the piston 162 for normally positioning the piston as shown in 161, and for thereby maintaining the valve 148 in seated position.

*Operation*

When the fluid pressure brake equipment shown in Fig. 1 is in condition for operation, fluid under pressure supplied to the reservoir 15 in the usual manner flows therefrom through the supply pipe 31 to the chamber 30 of the brake release valve device 16, and thence flows by way of the restricted port 40 in piston 33 to the piston chamber 38, and through the conduit 39 and passage 145 to the valve chamber 140 in the deceleration control valve device 20. It will be understood that the coil spring 122 normally maintains the valve 139 in seated position as shown in the drawings. With the brake valve device 14 in release position, the piston chamber 23 in the brake cylinder device 10 is maintained in communication with the atmosphere by way of the pipe 28 and the usual communications in the brake valve device.

Assuming that the vehicle is operated along the track in a direction to cause rotation of the wheel and axle assembly 11 in a counterclockwise direction, it will be apparent that the pumping gears 80 and 81 are driven at a speed corresponding to the rotative speed of the wheel to draw liquid from the supply chamber 78 through the intake pipe 94, past the check valve 93, and thence through the chamber 92 and passage 87 to the gear chambers 79, from which liquid is forced through the passage 86, past the discharge check valve 99, and through the chamber 96, passage 98 and chamber 97 to the bore 102. The pressure of liquid thus supplied to the bore 102 acts against the piston 103 to move the piston against the opposing force of the spring 130 and thus causes the piston to partially uncover the port 106, through which liquid under pressure then flows to the passageway 107. Liquid in the passageway 107 is free to flow therefrom to the chamber 108 and pipe 109 and thus to return to the supply chamber 78.

Liquid thus supplied to the passageway 107 also flows through the restricted passage 110 to the chamber 104, and thence by way of the restricted port 128 in the valve 126 to the chamber 125. I have found that the liquid will displace any air initially filling these chambers after a short period of operation.

It will be understood that the extent of movement of the piston 103 to uncover the port 106 is determined by the pressure of liquid supplied to the bore 102 by operation of the pumping gears 80 and 81, which are in turn driven in accordance with the speed of rotation of the associated wheel 11 of the vehicle. As the speed of the vehicles increases, the piston 103 will consequently be moved farther toward the left-hand in order to permit increased flow through the port 106 of liquid under pressure supplied by the pumping gears 80 and 81. As the piston 103 thus moves against the force of the spring 130, the spring seat member 129 and valve 126 are carried with the piston while liquid is at the same time forced from the chamber 104 through the restricted port 128 of the valve into the chamber 125. The smaller piston 116 of course remains stationary at this time due to engagement of the valve 139, carried on the end of the piston stem, with its seat.

The pressure of liquid within the chambers 125 and 104 is substantially the same as the fluid pressure within passage 107, chamber 108 and the supply chamber 78, which at this time may be approximately atmospheric pressure. The pressure of liquid within the intake pipe 94 and valve chamber 92 through which liquid is drawn by operation of the pumping gear is somewhat less than the fluid pressure in the supply chamber 78, so that the piston 161, which is subject to the pressure of liquid supplied to chamber 162 from valve chamber 92, is held in the normal position as shown in Fig. 1, under the force of spring 164. The sanding valves 148 and 149 are thus maintained in their respective seated and unseated positions, while the valve 154 is held in unseated position.

When it is desired to effect an application of the brakes, the self-lapping brake valve device 14 is operated to effect supply of fluid under pressure from the reservoir 15 to the supply pipe 28 and thence to the piston chamber 23 of the brake cylinder device 10. The piston 24 is thereby moved against the force of the spring 26 and through the medium of the piston rod 25 and associated brake rigging members, not shown, effects application of the usual brake shoes or other braking means to the wheel and axle assembly 11. The portion of the sleeve member 25a having the port 29 is thus carried outwardly of the cylinder end 21.

If the consequent deceleration of the vehicle is effected at a rate corresponding to the rate of deceleration of the wheel 11, so that any tendency of the wheel to slip on the rail is avoided, the pressure of liquid supplied to the bore 102 by the pumping gears 80 and 81 is reduced gradually, so that the spring 130 is permitted to shift the spring seat member 129, valve 126, and piston 103 to the right slowly enough to force liquid from the chamber 125 through the restricted port 128 to chamber 104 without exerting sufficient pressure on the piston 116 to overcome the force of spring 142. The valve 139 is thus still maintained in seated position.

If, however, the application of the brakes causes retardation of the wheel 11 at an excessive rate, so that the wheel begins to slip with respect to the rail, the relatively rapid reduction in speed of operation of the pumping gears 80 and 81 effects a correspondingly quick reduction in the pressure of liquid in the bore 102 acting on the piston 103. The spring 130 is thereby enabled to shift the spring seat member 129, valve 126 and piston 103 toward the normal position at a speed somewhat in excess of that which would permit complete displacement of liquid from the chamber 125 by way of the restricted port 128, so that liquid is momentarily entrapped within the chamber 125 and thus transmits sufficient pressure exerted by the spring 130 through the medium of the stem 117 and valve 139 to overcome the force of spring 142.

The valve 139 is thereby moved slightly away from its seat for permitting relatively restricted flow of fluid under pressure therepast, it being understood that the valve is not, under the operating condition now being described, moved to its fully unseated position. Fluid under pressure is supplied at a relatively slow rate of flow from the supply pipe 31 through the chamber 30 in the brake release valve device 16, the restricted port 40 in the piston 33, chamber 38, conduit 39, passage 145 in the deceleration control valve device 29, and then past the slightly unseated valve 139 and through passage 143, chamber 144, passage 155 and conduit 64 to the sanding device 17, which is thereby operated to supply sand through the sanding pipe 65 to the rail in advance of the wheel 11. The presence of sand on the rail will usually increase the coefficient of friction between the rail and wheel 11 sufficiently to cause the wheel to pick up or increase its rotative speed in time to avoid serious wheel slipping. Upon the resultant increase in the speed of operation of the pumping gears 80 and 81, further reduction in pressure of liquid in the bore 102 is prevented. Meanwhile, due to continued flow of liquid from the chamber 125 through the restricted port 128 of valve 126, the spring 142 becomes effective to permit the piston 116 to be returned to its normal position under the force of the spring 142, while the valve 139 is again moved to seated position. Further supply of sand to the rails is thus stopped.

Let it now be assumed that an application of the brakes is effected with such force as to cause deceleration of the wheel and axle assembly 11 at a rate in excess of the maximum rate permissible without causing wheel sliding, with the result that the speed of operation of the pumping gears 80 and 81 is rapidly reduced, thus causing a relatively sudden decline in the pressure of liquid supplied to the bore 102. Upon the quick reduction of liquid pressure within the bore 102 the piston 103 and spring seat member 129 are rapidly shifted under the force of the spring 130 toward normal position. As the spring seat member 129 and the valve 126 seated thereon are thus quickly moved toward the piston 115, liquid is entrapped therebetween due to the slow rate of flow permitted by the restricted port 128, and the piston 116, stem 117, and valve 139 are consequently forced to the right under the pressure of the spring 130 in opposition to the pressure of the spring 142. Because of the sudden movement of the piston 103, spring seat member 129 and valve 126 under the force of the spring 130 as just explained, only a relatively small amount of the liquid entrapped within the chamber 125 has time to flow therefrom to the chamber 104 by way of the restricted port 128, so that substantially the full force of the spring 130 is transmitted to the piston 116, which is thus operated to move the valve 139 to its fully unseated position.

With the valve 139 thus unseated, fluid under pressure is vented from the piston chamber 38 of brake release valve device 16 by way of the conduit 39, past the unseated valves 139 and 154 and through conduit 64 to the sanding device 17 at a faster rate than that of flow of fluid from the chamber 30 through the restricted port 40 in piston 33. Consequently, while the sanding device 17 is thereby operated in the usual manner to effect supply of sand through the sanding pipe 65 to the rail in advance of the wheel, the pressure of fluid in the chamber 30 moves the piston 33 upwardly and thereby lifts the valve 32 away from the seat rib 34, the valve 46 being meanwhile maintained in engagement with the seat rib 47 under the force of the spring 44, which force is now greater than is normally the case, due to compression of the spring. When the valve 32 is thus unseated, fluid under pressure is supplied from the supply pipe 31 by way of the chamber 30 and pipe 36 to the chamber 27 in the brake cylinder device 10, the piston 24 of which is then quickly moved toward release position by the force of the spring 26 upon substantial equalization of the pressures in chambers 23 and 27.

In response to the release of the brakes initiated as just explained, the wheel and axle assembly 11, aided by the increased traction resulting from the depositing of sand on the rail, again picks up speed until the rotative speed thereof corresponds with that of the vehicle, while the pumping gears 80 and 81 are driven to increase the supply of liquid under pressure to the bore 102 for again shifting the piston 103 and associated elements to the left against the force of the spring 130. Upon the quick movement of the piston 103 as just explained, the liquid within the chamber 104 is for a time subjected to a slightly increased pressure, since flow of liquid from the chamber through the restricted passage 110 to the passageway 107 is restricted while the spring 113 resists opening of the check valve 112, and the valve 126 is consequently unseated against the biasing force of the spring 131 for admitting liquid under pressure from the chamber 104 to the chamber 125, where the pressure of the liquid is effective through the medium of the piston 116 and stem 117 to maintain the valve 139 unseated.

It will thus be seen that, during such time as is required for the speed of rotation of the axle assembly 11 to increase from the rate at which it began to slip to a rate corresponding to the vehicle speed, fluid under pressure is continuously supplied from the piston chamber 38 of brake release valve device 16 to the sanding device 17, while the valve 32 is maintained unseated for supplying fluid under pressure to the chamber 27 of the brake cylinder device 10, as hereinbefore explained. In other words, the rail is sanded and the brakes held released to permit complete restoration of the rotative speed of the wheel and axle assembly to a rate corresponding with the speed of the vehicle.

The return of the rotative speed of the wheel 11 to a value corresponding to the speed of the vehicle, following the temporary release of the brakes as explained, is usually effected rapidly, and while the brakes associated with other wheels of a vehicle are still maintained applied. It is consequently desirable that a reapplication of the brakes for the wheel 11 be effected automatically after the wheel slipping condition has been corrected.

After movement of the piston 103 under the increased pressure of liquid in the bore 102 has been completed during restoration of the rotative speed of the wheel to the vehicle speed, the pressure of liquid in the connected chambers 104 and 125 again becomes equalized with that of the passageway 107. The valve 139, which had been maintained unseated by the pressure of liquid in the chamber 125 during the aforementioned operation of the acceleration control valve device 20, is then moved to the left to seated position under the force of the spring 142, the stem 117 and piston 116 being moved in the same direction to expel liquid from the chamber 125 through the restricted port 128 in valve 126, which is meanwhile returned to seated position by the spring 131. When the valve 139 is thus moved to seated position, further flow of fluid under pressure to the passage 143 and thence to the sanding device 17, is stopped, while the pressure of fluid in the chamber 38 of the brake release valve device 16 is quickly increased toward equalization with the fluid pressure in chamber 30, by flow of fluid through the restricted port 40. When the fluid pressures in chambers 30 and 38 become equalized, the piston 33 is operated to move valve 32 into engagement with the seat rib 34, under the force exerted by the spring 44 on the stem 41, so that the supply of fluid under pressure to the chamber 27 of the brake cylinder device 10 is cut off, while fluid under pressure begins to flow, from the chamber 27 to atmosphere by way of pipe 36, bore 35, and past the valve member 46. The spring 44 at this time exerts only its normal force to oppose unseating of the valve, since the collar 45 has been returned to the lower position as shown in Fig. 1.

Assuming that the supply of fluid under pressure by way of the brake valve device 14 and the pipe 28 to the piston chamber 23 of the brake valve device is still continued, the piston 24 is again forced to the right against the pressure of the spring 26 for effecting reapplication of the brakes. The spring 44, however, is adapted to move the valve element 46 into engagement with the seat 47 for cutting off complete flow of fluid under pressure from the spring chamber 27 when the fluid pressure therein has been reduced to a predetermined value, it being understood that the port 29 of the sleeve 25a is still held outwardly of the end 21 of the brake cylinder casing, so that the fluid pressure acting in the chamber 23 on the brake cylinder piston 24 is not effective to cause reapplication of the brakes to the same degree of force as existed prior to the slipping of the wheel.

When it is desired to effect the release of all brakes on the vehicle, the valve device 14 is moved to release position for venting the pipe 28 and brake cylinder chamber 23 to the atmosphere, whereupon the spring 22 moves the piston 24 and rod 25 to release position. As the port 29 in the hollow brake cylinder rod 25 is thus brought into communication with the chamber 27, the fluid under pressure remaining therein is discharged to the atmosphere, so that the brake cylinder device is then in condition for subsequent operation to effect application of the brakes in the usual manner.

If the vehicle is driven along the rail in the opposite direction, so that the wheel and axle assembly 11 is rotated in a clockwise direction, the pumping gear 80 is likewise rotated in a clockwise direction for turning the pumping gear 81 in a counterclockwise direction, thereby drawing liquid from the supply reservoir 78 through the intake pipe 90, past inlet valve 89, and through chamber 88 to the chamber 79, from which the liquid is forced under pressure through the passage 87 and past the discharge valve 100 to the bore 102 for operating the piston 103 in the manner hereinbefore explained. At the same time liquid under pressure is supplied from the passage 87 through chamber 92 and passage 163 to the piston chamber 162, and moves the piston 161 upwardly against the force of the spring 164, thereby seating the valve 150 and unseating the valve 148. As the valve 148 is moved upwardly and away from its seat the valve 154 is lifted into seated position under the pressure of the spring 157. The several valve elements are thus positioned to condition the sanding device 18 for operation, while the sanding mechanism 17 at the trailing side of the wheel and axle assembly 11 is rendered inoperative.

If an application of the brakes is now effected with excessive force, causing the wheel 11 to slip with respect to the rails so as to effect operation of the deceleration control valve device 20 in the manner hereinbefore explained, the consequent unseating of the valve 139 will effect supply of fluid under pressure in the usual manner from the valve chamber 140 and through the passage 143 and chamber 144, past the unseated valve 148, and through the conduit 62 and nozzle 61 to sand chamber 57 of sanding device 18. Sand is thereby driven from the sand chamber and through the sand pipe 58 to the rail in advance of the wheel 11.

From the foregoing it will be apparent that a brake control equipment constructed in accordance with my invention comprises liquid pumping means operative in accordance with the rotative speed of a vehicle wheel to vary the pressure of liquid acting on a movable abutment, which is responsive to a sudden reduction in said pressure to cause quick release of the brakes to prevent sliding of the wheel, and is responsive to subsequent pick-up in rotative speed of the wheel to permit reapplication of the brakes. According to a further feature of the invention, sanding means is provided for supplying sand to the rail in advance of the wheel upon operation of the control equipment in response to initial slipping thereof. The sanding means is further operative to continue supplying sand to the rails during operation of the brake control equipment to effect the release of the brakes, or until the associated wheel has resumed the speed corresponding to the speed of the vehicle.

While one illustrative embodiment of the invention has been described in detail, it is not intended to limit the invention to that embodiment or otherwise than by the terms of the appended claims.

Having now described my invention, what I claim as new and desire to secure by Letters Patent, is:

1. Vehicle brake and sanding control apparatus comprising, in combination, manually operated means for controlling the application and release of the brakes associated with a wheel of the vehicle, means operative to effect sanding, brake control means operative while the manually operative means is conditioned to cause application of the brakes to effect release of the brakes and subsequent reapplication thereof, and means responsive to the rotative deceleration of the vehicle wheel at a rate in excess of a certain rate for effecting operation of said sanding means and responsive to rotative deceleration of the vehicle wheel at a second certain rate higher than the first certain rate for effecting operation of the brake control means.

2. Vehicle brake and sanding control apparatus comprising, in combination, manually operative means for controlling the application and release of the brakes associated with a wheel of the vehicle, means for effecting sanding, brake control means operative, while the manually operative means is conditioned to cause application of the brakes, to effect a release of the brakes and subsequent reapplication thereof, and means controlled in accordance with the rate of rotative deceleration of the wheel for effecting sequential operation of said sanding means and brake control means.

3. Vehicle brake and sanding control apparatus comprising, in combination, manually operative means for controlling application and release of the wheel brakes of the vehicle, means operative to effect sanding, brake control means operative, while the manually operative means is conditioned to cause application of the brakes, to effect the release of the brakes and the subsequent reapplication thereof, means responsive to the rate of deceleration of a vehicle wheel, and means controlled by the last said means for effecting operation of the sanding means and the brake control means in succession in the order named.

4. Vehicle brake and sanding control apparatus comprising, in combination, manually operative means for controlling the application and release of the brakes associated with a wheel of the vehicle, means operative to effect sanding, braking control means operative, while the manually operative means is conditioned to cause application of the brakes, to effect release of the brakes and subsequent reapplication thereof, means controlled according to the rate of rotative deceleration of the wheel for effecting operation of said sanding means and said brake control means in succession, and means effective, once the brake control means is operated to effect release of the brakes, to prevent subsequent operation thereof to effect reapplication of the brakes until the rotative speed of the wheel corresponds to the speed of the vehicle.

5. A brake and sanding control equipment adapted for association with the brakes for a vehicle wheel, comprising brake release means operative to effect the release of the brakes, a pair of sanding devices operative to supply sand at opposite sides of said wheel, directional control means normally conditioned to render one of said sanding devices operable and the other inoperable and responsive to an increase in fluid pressure to reverse the operating condition of said sanding devices, fluid pumping means driven by said wheel and operative according to rotation thereof in one direction to supply fluid under pressure to a chamber and according to rotation of said wheel in the opposite direction to supply fluid under pressure to said chamber and to said directional control means, whereby the sanding mechanism in advance of the wheel is always conditioned for operation, and means responsive to a sudden reduction in the pressure of fluid in said chamber to effect operation of the operative sanding mechanism and of said brake release means.

6. In a sanding control equipment for association with a vehicle wheel: sanding means, and sanding control means cooperative therewith to govern the supply of sand in advance of the wheel, said sanding control means including a pump driven by said wheel for supplying liquid under a pressure varying in accordance with the speed thereof, a spring, movable abutment means subject to the opposing pressures of said spring and of the liquid supplied by said pump for controlling a discharge communication therefor, a piston movable relatively to the abutment means and operative to actuate said brake control means, means for entrapping liquid between said abutment means and said piston to render the piston responsive to quick movement of the abutment means, and means for gradually releasing said liquid during slow movement of the abutment means.

7. Sanding control apparatus for governing the deposition of sand in advance of a vehicle wheel, comprising sand supply means, speed responsive mechanism operative to establish a fluid pressure proportional to the rotative speed of said wheel, a movable abutment subject to said fluid pressure and to a substantially constant opposing pressure, an element movable by said abutment through a chamber adapted to contain a quantity of liquid, means for effecting restricted flow of liquid from one side of said element to the other during normal gradual movement thereof by said abutment, and means for actuating said sand supply means including a piston subject to the pressure of liquid entrapped at one side of said element upon sudden movement thereof due to a change in the rotative speed of said wheel at an undesirable rate.

8. Sanding control apparatus for governing the supply of sand in advance of a wheel of a railway truck having a journal box, comprising sand supply means, a casing structure adapted to be carried by the journal box associated with the wheel and having formed therein a liquid supply reservoir and a pressure chamber, a pump mounted in said casing structure and operative to supply liquid from said reservoir to said chamber at a rate proportional to the rotative speed of said wheel, a movable abutment controlling a return passage from said chamber to said reservoir and movable through a range of positions corresponding to variations in the pressure of liquid in said chamber, and means responsive to hydraulic pressure created upon sudden movement of said abutment from one position to another for actuating said sand supply means.

BURTON S. AIKMAN.